United States Patent
Ohashi et al.

(10) Patent No.: US 10,384,508 B2
(45) Date of Patent: *Aug. 20, 2019

(54) VEHICLE-HEIGHT CONTROL SYSTEM

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Hideki Ohashi, Chiryu (JP); Katsuyuki Sano, Miyoshi (JP); Jun Tokumitsu, Toyota (JP); Ryo Kanda, Nissin (JP); Shogo Tanaka, Toyota (JP); Masaaki Oishi, Takahama (JP); Ken Ogue, Okazaki (JP); Masakazu Ohashi, Toyota (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 22 days.

This patent is subject to a terminal disclaimer.

(21) Appl. No.: 15/448,950

(22) Filed: Mar. 3, 2017

(65) Prior Publication Data
US 2017/0259641 A1    Sep. 14, 2017

(30) Foreign Application Priority Data
Mar. 14, 2016    (JP) ................. 2016-049198

(51) Int. Cl.
*B60G 17/015*    (2006.01)
*B60G 17/0165*    (2006.01)
(Continued)

(52) U.S. Cl.
CPC ....... *B60G 17/0165* (2013.01); *B60G 17/019* (2013.01); *B60G 17/0155* (2013.01);
(Continued)

(58) Field of Classification Search
None
See application file for complete search history.

(56) References Cited

U.S. PATENT DOCUMENTS

| 4,695,074 A | 9/1987 | Kobayashi et al. |
| 4,709,934 A | 12/1987 | Suzuki et al. |
| (Continued) | | |

FOREIGN PATENT DOCUMENTS

| DE | 10160972 C1 | 1/2003 |
| DE | 102008040054 A1 | 1/2010 |
| (Continued) | | |

OTHER PUBLICATIONS

U.S. Appl. No. 15/449,427, filed Mar. 3, 2017 in the name of Ohashi et al.

(Continued)

*Primary Examiner* — Thomas G Black
*Assistant Examiner* — Demetra R Smith-Stewart
(74) *Attorney, Agent, or Firm* — Oliff PLC

(57) ABSTRACT

A vehicle-height control system is configured to control a vehicle height for a wheel. The vehicle-height control system includes: a vehicle-height control actuator provided so as to correspond to the wheel; a pressure-medium supply and discharge device configured to supply and discharge a pressure medium to and from the vehicle-height control actuator; and a vehicle height controller configured to control the vehicle height for the wheel by controlling the pressure-medium supply and discharge device based on an inside temperature and an outside-air temperature to control at least one of supply and discharge of the pressure medium to and from the vehicle-height control actuator. The inside temperature is a temperature in the vehicle-height control system.

8 Claims, 10 Drawing Sheets

(51) Int. Cl.
*B60G 17/019* (2006.01)
*B60G 17/052* (2006.01)

(52) U.S. Cl.
CPC ....... *B60G 17/052* (2013.01); *B60G 17/0523* (2013.01); *B60G 17/0525* (2013.01); *B60G 17/0528* (2013.01); *B60G 2202/152* (2013.01); *B60G 2202/42* (2013.01); *B60G 2400/71* (2013.01); *B60G 2400/7122* (2013.01); *B60G 2400/8422* (2013.01); *B60G 2500/202* (2013.01); *B60G 2500/204* (2013.01); *B60G 2500/30* (2013.01)

(56) References Cited

U.S. PATENT DOCUMENTS

| | | | |
|---|---|---|---|
| 5,162,995 A | | 11/1992 | Ikemoto et al. |
| 5,711,150 A | | 1/1998 | Oshita et al. |
| 6,116,586 A | | 9/2000 | Westerkamp et al. |
| 6,260,677 B1 | * | 7/2001 | Hayakawa ............. B60G 15/00 188/274 |
| 6,266,590 B1 | | 7/2001 | Kutscher et al. |
| 6,332,623 B1 | | 12/2001 | Behmenburg et al. |
| 6,354,617 B1 | | 3/2002 | Behmenburg et al. |
| 6,623,016 B2 | | 9/2003 | Sulzyc et al. |
| 2002/0166321 A1 | | 11/2002 | Oldenettel |
| 2003/0107191 A1 | | 6/2003 | Romer et al. |
| 2004/0188970 A1 | | 9/2004 | Matern et al. |
| 2005/0035562 A1 | | 2/2005 | Meier et al. |
| 2007/0228676 A1 | | 10/2007 | Stegmann |
| 2007/0251575 A1 | | 11/2007 | Ilias et al. |
| 2011/0093166 A1 | | 4/2011 | Li et al. |
| 2012/0073669 A1 | | 3/2012 | Diekmeyer |
| 2013/0320645 A1 | | 12/2013 | Gall |
| 2015/0145220 A1 | | 5/2015 | Yellambalase et al. |
| 2016/0272035 A1 | * | 9/2016 | Oishi ................. B60G 17/0525 |
| 2016/0280034 A1 | * | 9/2016 | Ogino .................... B60G 11/27 |
| 2017/0182857 A1 | * | 6/2017 | Ohashi ................. B60G 11/27 |
| 2017/0259640 A1 | * | 9/2017 | Ohashi ............... B60G 17/0155 |
| 2017/0274720 A1 | * | 9/2017 | Iyoda ................... B60G 17/056 |

FOREIGN PATENT DOCUMENTS

| | | |
|---|---|---|
| DE | 102010048252 A1 | 5/2011 |
| EP | 1442903 A1 | 8/2004 |
| EP | 1504929 A2 | 2/2005 |
| JP | H03-70615 A | 3/1991 |
| JP | 2007-203974 A | 8/2007 |
| JP | 4040898 B2 | 1/2008 |
| JP | 2012-025190 A | 2/2012 |
| JP | 4896878 B2 | 3/2012 |
| JP | 5047789 B2 | 10/2012 |
| JP | 2016-215963 A | 12/2016 |

OTHER PUBLICATIONS

Mar. 22, 2018 Office Action issued in U.S. Appl. No. 15/449,427.
U.S. Appl. No. 14/449,427, filed Mar. 3, 2017 in the name of Ohashi et al.

* cited by examiner

AIR INTAKE CONTROL

UP CONTROL

DOWN CONTROL

VEHICLE-HEIGHT CONTROL SYSTEM

CROSS REFERENCE TO RELATED APPLICATION

The present application claims priority from Japanese Patent Application No. 2016-049198, which was filed on Mar. 14, 2016, the disclosure of which is herein incorporated by reference in its entirety.

BACKGROUND

The present disclosure relates to a vehicle-height control system.

Patent Document 1 (Japanese Patent Application Publication No. 3-70615) discloses a vehicle-height control system in which supply and discharge of air to and from air cylinders respectively provided for four wheels are controlled to bring a vehicle height for each wheel closer to a target vehicle height.

SUMMARY

Accordingly, an aspect of the disclosure relates to a vehicle-height control system that executes vehicle height control well.

In one aspect of the disclosure, a vehicle-height control system executes vehicle height control based on (i) an inside temperature which is a temperature in the vehicle-height control system and (ii) an outside-air temperature which is a temperature outside a vehicle. In the case where a vehicle-height control actuator is defined as one sealed space, a change of temperature of air as a pressure medium changes a vehicle height (PV=nRT). For example, the vehicle height lowers with lowering of the temperature of the air as the pressure medium. Thus, the vehicle height is controlled to a relatively high vehicle height when control for lowering the vehicle height (hereinafter may be referred to as "down control") is executed in the case where the inside temperature in the vehicle-height control system is higher than the outside-air temperature. As a result, when the temperature of the air as the pressure medium lowers, the vehicle height is brought close to a true target vehicle height.

The inside temperature in the vehicle-height control system is the temperature of the pressure medium in the vehicle-height control system. Examples of the inside temperature include: the temperature of the pressure medium in the vehicle-height control actuator; and the temperature of the pressure medium in a pressure-medium supply and discharge device configured to supply and discharge the pressure medium to and from the vehicle-height control actuator (e.g., in a tank or a passage). Also, the temperature of the pressure medium in the vehicle-height control system may also be estimated based on an ambient temperature (an atmospheric temperature) outside the passage or the tank of the pressure-medium supply and discharge device. The outside-air temperature is an ambient temperature (an atmospheric temperature) outside the vehicle. For example, the outside-air temperature may be a temperature detected by an outside-air-temperature sensor provided on a portion of a vehicle body at which a temperature is estimated to be substantially equal to the outside-air temperature. The outside-air-temperature sensor is mountable on a back surface of a front bumper and a door mirror, for example.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described vehicle-height control systems according to embodiments by reference to the drawings. The present vehicle-height control systems utilize air as a pressure medium.

First Embodiment

Figure 1:
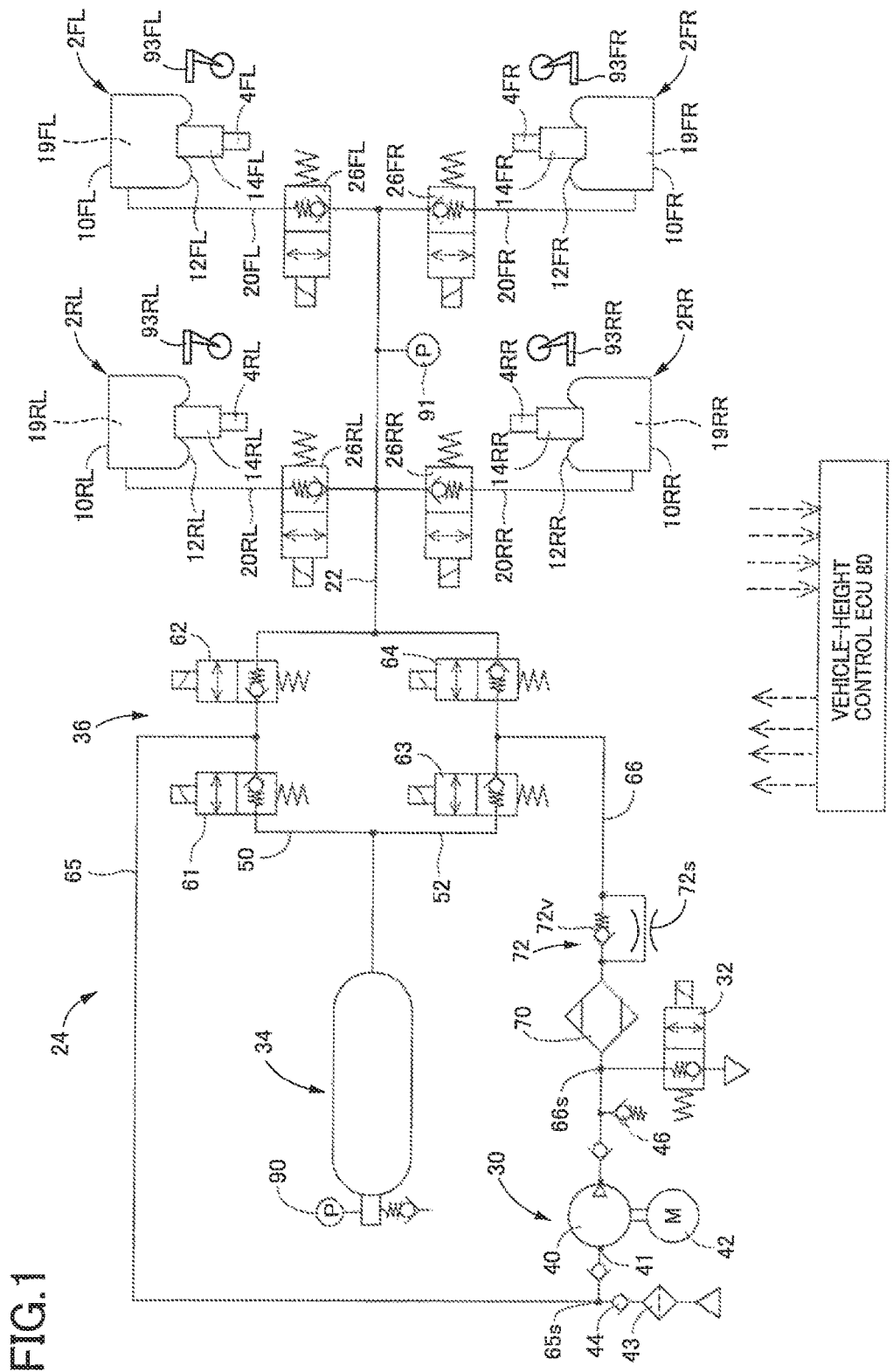
FIG. 1 is a circuit diagram of a vehicle-height control system according to a first embodiment.

In a vehicle-height control system according to a first embodiment, as illustrated in FIG. 1, air cylinders 2FL, 2FR, 2RL, 2RR each as a vehicle-height control actuator and shock absorbers 4FL, 4FR, 4RL, 4RR are provided in parallel between a wheel-side member and a vehicle-body-side member, not illustrated. The air cylinders 2FL, 2FR, 2RL, 2RR respectively correspond to front left, front right, rear left, and rear right wheels provided on a vehicle. Likewise, the shock absorbers 4FL, 4FR, 4RL, 4RR respectively correspond to the front left, front right, rear left, and rear right wheels. Each of the shock absorbers 4FL, 4FR, 4RL, 4RR includes a cylinder body provided on the wheel-side member and a piston provided on the vehicle-body-side member. In the following description, each of the air cylinders 2 and other similar components will be referred with a corresponding one of suffixes (FL, FR, RL, RR) indicative of the respective wheels where the air cylinders 2 and other similar component should be distinguished by their respective wheel positions. On the other hand, where these devices are collectively referred, or the distinction is not required, each of the air cylinders 2 and other similar components will be referred without such suffixes. Each of the air cylinders 2 includes: a cylinder body 10 provided on the vehicle-body-side member; a diaphragm 12 fixed to the cylinder body 10; and an air piston 14 provided on the diaphragm 12 and the cylinder body of the corresponding shock absorber 4 so as to be immovable relative to the diaphragm 12 and the cylinder body in the up and down direction. Interiors of these components serve as an air chamber 19 as a pressure medium chamber. When air is supplied to or discharged from the air chamber 19, the air piston 14 is moved relative to the cylinder body 10 in the up and down direction. This movement moves the cylinder body and the piston of the shock absorber 4 relative to each other in the up and down direction. As a result, a distance between the wheel-side member and the vehicle-body-side member is changed, that is, a vehicle height is changed.

An air supply and discharge device 24 as a pressure-medium supply and discharge device is connected to the air chambers 19 of the respective air cylinders 2, via respective individual passages 20 and a common passage 22. Vehicle-height control valves 26 are provided on the respective individual passages 20. Each of the vehicle-height control valves 26 is a normally closed electromagnetic valve. When being in an open state, the vehicle-height control valve 26 allows flow of air in opposite directions. When being in a closed state, the vehicle-height control valve 26 prevents flow of air in a direction directed from the air chambers 19 to the common passage 22 but allows flow of air in the direction directed from the common passage 22 to the air chambers 19 when a pressure of air in the common passage 22 becomes higher than a pressure of air in the air chamber 19 by a set pressure.

The air supply and discharge device 24 as the pressure-medium supply and discharge device includes a compressor device 30, an air-discharge valve 32, a tank 34, and a switching device 36. The compressor device 30 includes: a compressor 40; an electric motor 42 that drives the compressor 40; an intake valve 44 that is a check valve provided between an atmosphere and an intake-side portion 41 of the compressor 40; and a relief valve 46 provided on a discharge-side of the compressor 40. When a pressure of air in the intake-side portion 41 of the compressor 40 becomes lower than the atmospheric pressure, the compressor 40 sucks air from the atmosphere via a filter 43 and the intake valve 44. When a discharge pressure of the compressor 40 has increased, air is discharged to the atmosphere via the relief valve 46. The tank 34 stores air in a pressurized state. A pressure of the air in the tank 34 increases with increase in amount of air stored in the tank 34.

The switching device 36 is provided among the common passage 22, the tank 34, and the compressor device 30 to switch a direction in which air flows among them. As illustrated in FIG. 1, the common passage 22 and the tank 34 are connected to each other by a first passage 50 and a second passage 52 which are provided in parallel. Circuit valves 61, 62 are provided on the first passage 50 in series. Circuit valves 63, 64 are provided on the second passage 52 in series. A third passage 65 is connected to the first passage 50 at a position located between the two circuit valves 61, 62 and connected to an intake-side portion 41 of the compressor 40. A fourth passage 66 is connected to the second passage 52 at a position located between the two circuit valves 63, 64 and connected to an ejection-side portion of the compressor 40. Each of the circuit valves 61-64 is a normally closed valve. When being in an open state, each of the circuit valves 61-64 allows flow of air in opposite directions. When being in a closed state, each of the circuit valves 61-64 prevents flow of air from one side to the other side but allows flow of air from the other side to the one side when a pressure of air on the other side becomes higher than that on the one side by a set pressure. Each of the circuit valves 61, 63 in the closed state prevents air from flowing out of the tank 34. The circuit valve 62 in the closed state prevents air from flowing out of the common passage 22. The circuit valve 64 in the closed state prevents supply of air to the common passage 22.

The air-discharge valve 32 is a normally closed electromagnetic valve provided on the fourth passage 66 at a position located on an ejection-side of the compressor 40. When being in an open state, the air-discharge valve 32 allows discharge of air from the fourth passage 66 to the atmosphere. When being in a closed state, the air-discharge valve 32 prevents discharge of air from the fourth passage 66 to the atmosphere. The air-discharge valve 32 however allows supply of air from the atmosphere to the fourth passage 66 when a pressure of air in the fourth passage 66 becomes lower than the atmospheric pressure by a set pressure in the closed state. A dryer 70 and a flow restricting mechanism 72 are provided in series on the fourth passage 66 at positions located on a side of the air-discharge valve 32 which is located nearer to the second passage 52. The flow restricting mechanism 72 includes a pressure differential valve 72v and a restrictor 72s provided in parallel. The pressure differential valve 72v prevents flow of air from a second-passage side to a compressor side. When a pressure on the compressor side becomes higher than that on the second-passage side by a set pressure, the pressure differential valve 72v allows flow of air from the compressor 40 to the second passage 52.

Figure 2:
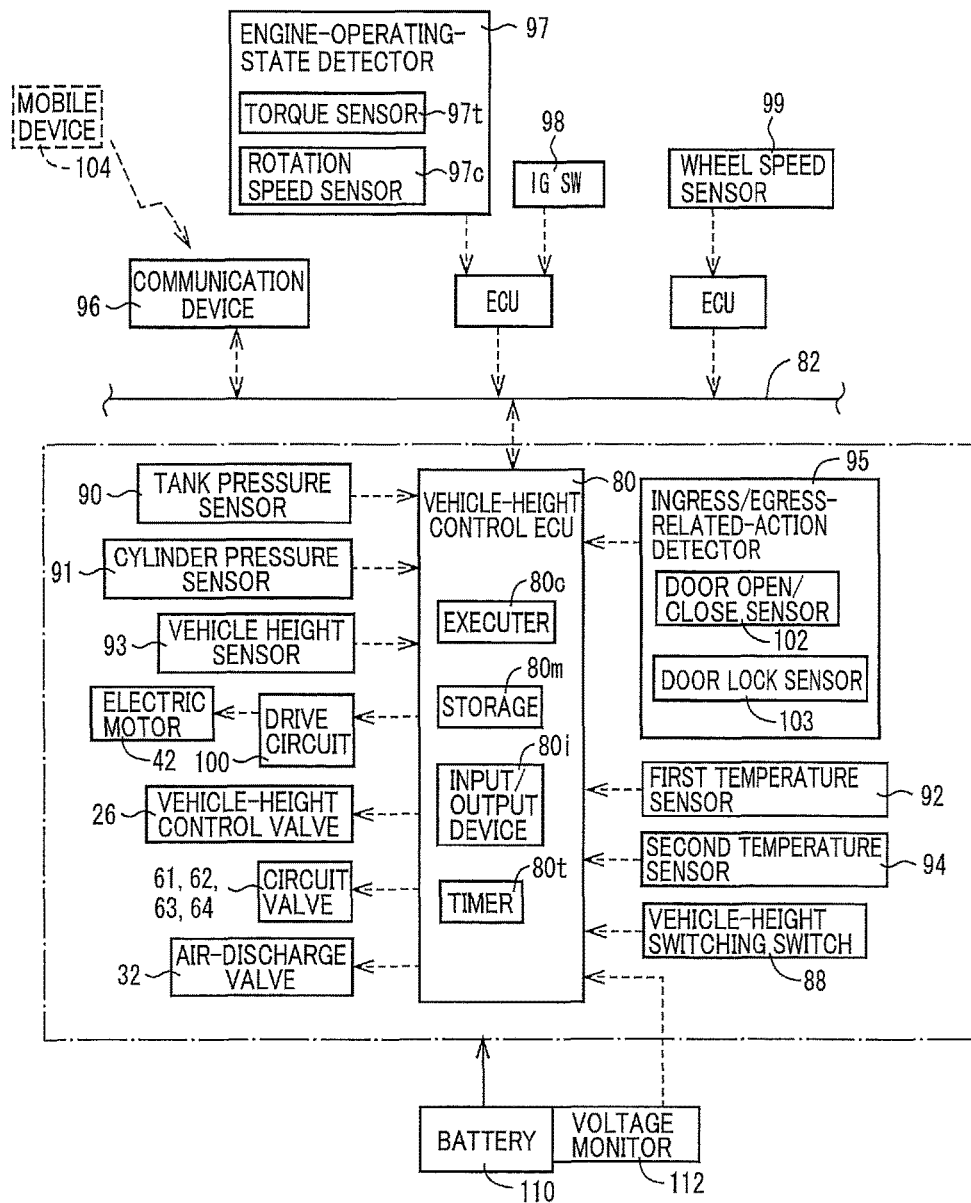
FIG. 2 is a conceptual view illustrating a vehicle-height control ECU and devices connected thereto in the vehicle-height control system.

In the present embodiment, the vehicle-height control system is controlled by a vehicle-height control electronic control unit (ECU) 80 mainly constituted by a computer. The vehicle-height control ECU 80 is communicable with devices, such as ECUs, via a controller area network (CAN) 82. As illustrated in FIG. 2, the vehicle-height control ECU 80 includes an executer 80c, a storage 80m, an input/output device 80i, and a timer 80t. Devices connected to the input/output device 80i include a vehicle-height switching switch 88, a tank pressure sensor 90, a cylinder pressure sensor 91, vehicle height sensors 93, a first temperature sensor 92, a second temperature sensor 94, and ingress/egress-related-action detectors 95. Also, devices including a communication device 96, an engine-operating-state detector 97, an ignition switch 98, and wheel speed sensors 99 are connected to the input/output device 80i via the CAN 82. The electric motor 42 is connected to the input/output device 80i via a drive circuit 100. The air-discharge valve 32, the vehicle-height control valves 26, and the circuit valves 61-64 are connected to the input/output device 80i.

A driver operates the vehicle-height switching switch 88 to instruct a change of the vehicle height to one of "L" (Low), "N" (Normal), and "H" (High). The tank pressure sensor 90 detects a pressure of air stored in the tank 34 (hereinafter simply referred to as "tank pressure"). The cylinder pressure sensor 91 is provided on the common passage 22. When any of the vehicle-height control valves 26 is open, the cylinder pressure sensor 91 detects a pressure of air in the air chamber 19 defined in the air cylinder 2 corresponding to the open vehicle-height control valve 26 (the wheel). When all the vehicle-height control valves 26 are closed, the cylinder pressure sensor 91 detects a pressure of the air in the common passage 22. The vehicle height sensors 93 are provided for the respective wheels 2FL, 2FR, 2RL, 2RR. Each of the vehicle height sensors 93 detects a deviation from a standard length of a distance between the wheel-side member and the vehicle-body-side member (noted that the standard length corresponds to a standard vehicle height) to detect a vehicle height which is a distance between the vehicle-body-side member and the wheel-side member, i.e., a height of the vehicle-body-side member from the wheel-side member. The first temperature sensor 92 detects an outside-air temperature which is a temperature of atmosphere outside the vehicle (ambient temperature). For example, the first temperature sensor 92 is mounted on a portion of a vehicle body at which the temperature is estimated to be substantially equal to the outside-air temperature. For example, the first temperature sensor 92 is mounted on a back surface of a front bumper or inside a door mirror. In the present embodiment, the second temperature sensor 94 detects a temperature of atmosphere near the tank 34, i.e., near an outer surface of the tank 34, (the ambient temperature). The temperature of air as the pressure medium in the vehicle-height control system is obtained based on the atmospheric temperature near the tank which is detected by the second temperature sensor 94. The ingress/egress-related-action detectors 95 detect the presence or absence of operation relating to getting on and off of the vehicle. The ingress/egress-related-action detectors 95 are provided respectively for a plurality of doors provided on the vehicle. Each of the ingress/egress-related-action detectors 95 includes: a door open/close sensor (a courtesy lamp sensor) 102 that detects opening and closing of a corresponding one of the doors; and a door lock sensor 103 that detects a locking operation and an unlocking operation for the corresponding door. Getting on and off and intention of start of driving are estimated based on opening and closing of the door and the locking and unlocking operations for the door, for example. The communication device 96 communicates with a mobile device 104 owned by, e.g., the driver in a predetermined communicable area. The locking and unlocking operations for the door may be performed based on the communication of the communication device 96. The engine-operating-state detector 97 includes a plurality of sensors including: a rotation speed sensor 97c that detects a rotation speed of an engine; and a torque sensor 97t that detects an output torque of the engine. Various states of the engine such as an operating state and a heating state are detected based on, e.g., the rotation speed and the output torque of the engine. The wheel speed sensors 99 are provided respectively for the front left, front right, rear left, and rear right wheels to detect rotational speeds of the respective wheels. A running speed of the vehicle is obtained based on the rotational speeds of the respective four wheels, for example. In the present embodiment, the vehicle-height control system is operable by electric power supplied from a battery 110. The voltage of the battery 110 is detected by a voltage monitor 112.

Figure 3A:
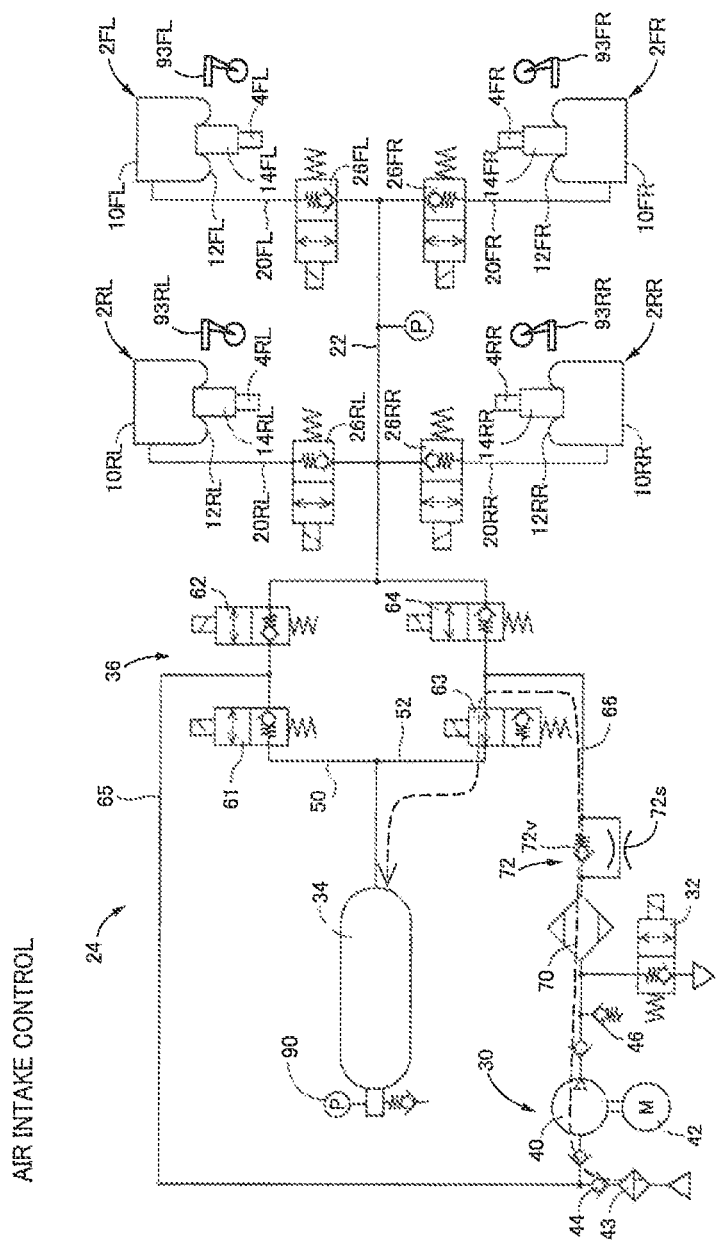
FIG. 3A is a view illustrating a state in the case where air is supplied to a tank of the vehicle-height control system.
Figure 3B:
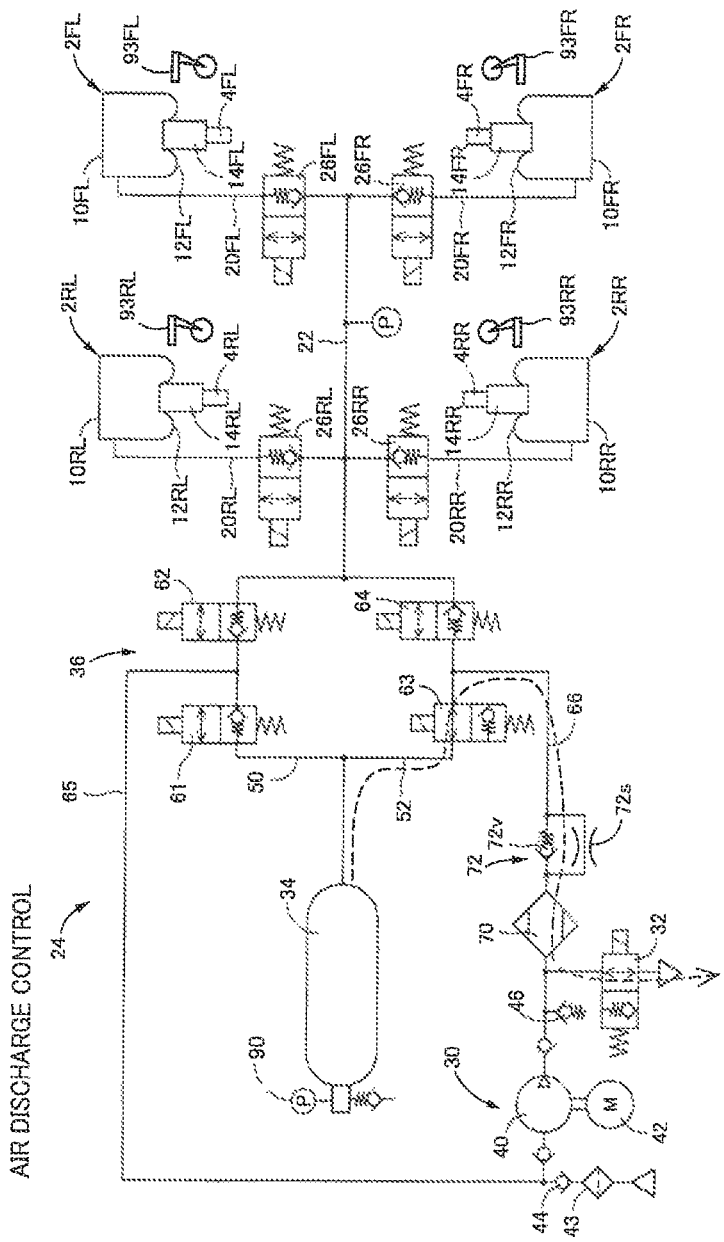
FIG. 3B is a view illustrating a state in the case where air is discharged from the tank.

There will be next explained tank pressure control. Vehicle height control is performed using the tank 34 in the vehicle-height control system configured as described above. The vehicle height control includes control of the tank pressure which includes: air intake control as supply control for supplying air to the tank 34; and air discharge control as discharge control for discharging air from the tank 34. The air intake control is started when a tank pressure PT detected by the tank pressure sensor 90 becomes lower than an air-intake threshold value. As illustrated in FIG. 3A, the electric motor 42 is driven to operate the compressor 40 in a state in which the circuit valves 61, 62, 64 are closed, and the circuit valve 63 is open. Air is sucked from atmosphere by the compressor 40 via the intake valve 44 as a supply valve and stored into the tank 34. The air discharge control is executed when the tank pressure PT becomes higher than an air-discharge threshold value. As illustrated in FIG. 3B, the air-discharge valve 32 as a discharge valve is opened, the circuit valves 61, 62, 64 are closed, and the circuit valve 63 is opened. The air in the tank 34 is discharged to the atmosphere via the dryer 70 and the air-discharge valve 32.

Figure 4A:
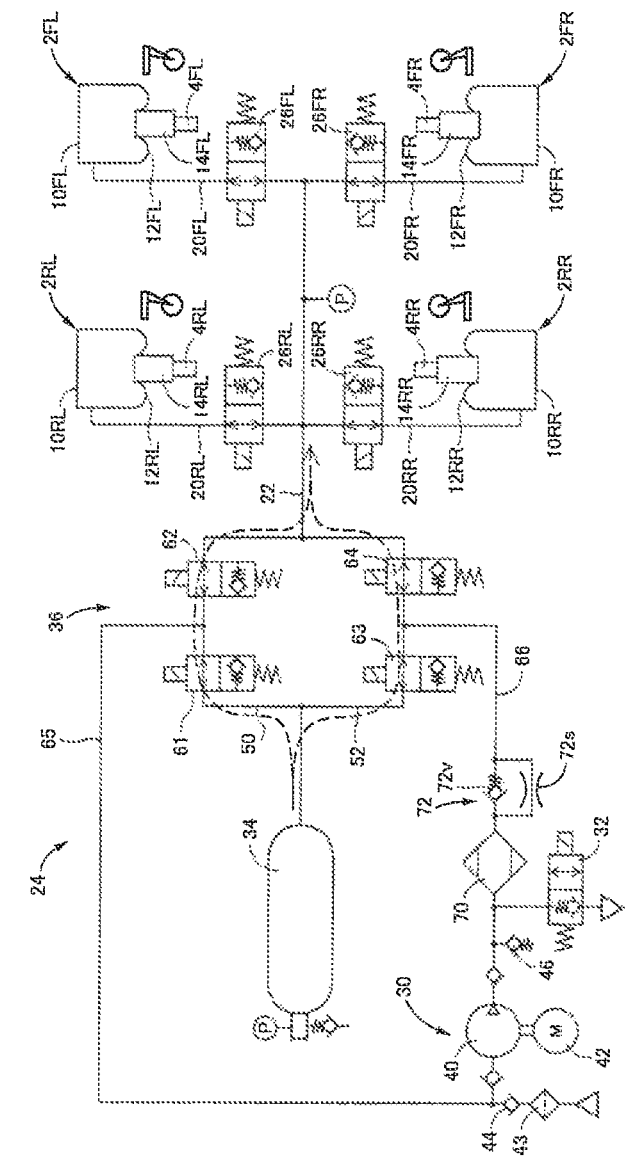
FIG. 4A is a view illustrating a state in the case where air is supplied to air cylinders of the vehicle-height control system.
Figure 4B:
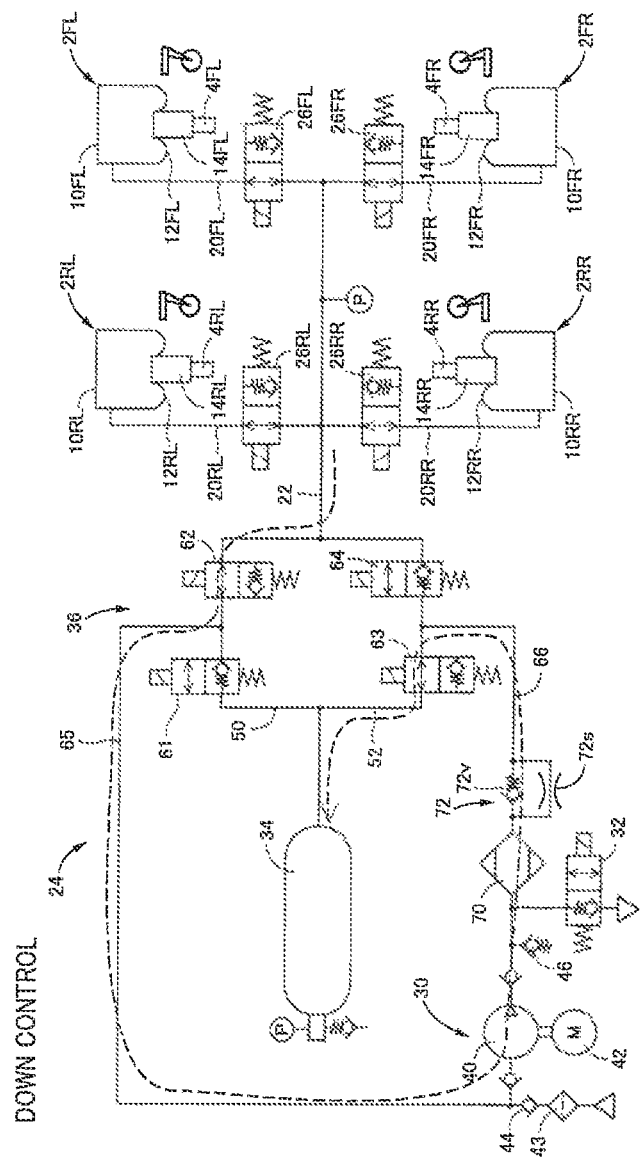
FIG. 4B is a view illustrating a state in the case where air is discharged from the air cylinders.

There will be next explained the vehicle height control. In the present embodiment, the vehicle height is controlled by air transfer between the tank 34 and the air cylinders 2. In the case where the vehicle height is to be increased (noted that this control may be hereinafter referred to as "up control"), as illustrated in FIG. 4A, the circuit valves 61-64 are opened, and the vehicle-height control valve 26 corresponding to each control target wheel is opened. In FIG. 4A, the front left and right and rear left and right wheels are control target wheels, but the following explanation will be provided for one of the control target wheels for simplicity. The air stored in the tank 34 is supplied to the air chamber 19 defined in the air cylinder 2 provided for the control target wheel. As a result, the vehicle height for the control target wheel is increased. In the case where the vehicle height is to be reduced (noted that this control may be hereinafter referred to as "down control"), as illustrated in FIG. 4B, the electric motor 42 is driven to actuate the compressor 40, the circuit valves 61, 64 are closed, the circuit valves 62, 63 are opened, and the vehicle-height control valve 26 corresponding to the control target wheel is opened. Air in the air chamber 19 defined in the air cylinder 2 is sucked from the compressor 40 and supplied to the tank 34.

In the vehicle-height control, during running of the vehicle, a target vehicle height is obtained for each of the front left, front right, rear left, and rear right wheels based on the running state of the vehicle, and the air supply and discharge device 24 and the vehicle-height control valve 26 are controlled so as to bring an actual vehicle height for each wheel closer to the target vehicle height. Specifically, the vehicle height is lowered during high speed running, thereby improving running stability and fuel consumption. In a state in which the vehicle is stopped, the vehicle height control is executed in the case where a predetermined condition is satisfied. Examples of this case include: a case where it is estimated that a person is to get on or off the vehicle; and a case where an appearance improvement condition is satisfied. In the case where it is estimated that a person is to get on or off the vehicle, the vehicle height is increased. The vehicle height is lowered in the case where the appearance improvement condition is satisfied, for example, in the case where the mobile device 104 has moved far away according to communication with the mobile device 104 and where an OFF state of the ignition switch 98 continues for longer than or equal to a set length of time. In the case where the vehicle-height switching switch 88 is operated, the system is controlled to achieve the vehicle height instructed by the operation. In the case where the vehicle height is changed by change of a load and getting on or off of the vehicle by an occupant, for example, the attitude of the vehicle is corrected automatically to control the vehicle height.

Figure 5:
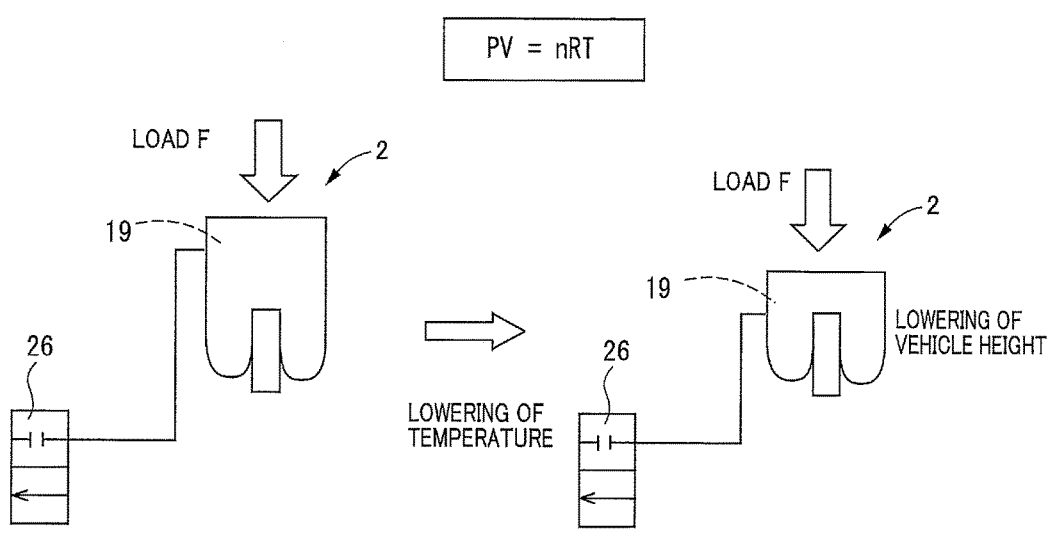
FIG. 5 is a view schematically illustrating a relationship between a vehicle height and a temperature.

The vehicle height in some cases changes due to change of the temperature T of the air in the air chamber 19 (hereinafter may be referred to as "air-chamber temperature"). For example, assuming that the air cylinder 2 is defined as a single sealed space, the equation "PV=nRT" is established, where P is a pressure of the air in the air chamber 19, V is a volume of the air chamber 19, n is an amount of air (i.e., the number of moles), and T is the air-chamber temperature. According to this equation, as illustrated in FIG. 5, in the case where a load F acting on the wheel and the pressure P of the air are constant, the volume V of the air chamber 19 is smaller, and the vehicle height is lower when the air-chamber temperature T is low than when the air-chamber temperature T is high. Thus, the actual vehicle height becomes lower than the target vehicle height in some cases after the air-chamber temperature T lowers even when the down control is executed to bring the vehicle height closer to the target vehicle height because an actual vehicle height, which is an actual value of the vehicle height for the wheel, is higher than the target vehicle height in the case where the air-chamber temperature T is high. To solve this problem, in the present embodiment, in the case where it is determined that the air-chamber temperature T is high with respect to the outside-air temperature, in other words, in the case where the air-chamber temperature T is temporarily high by a disturbance, e.g., heating by the engine, and it is estimated that the air-chamber temperature T lowers later, the down control is executed such that the actual vehicle height H* becomes a value higher than the target vehicle height (a true target vehicle height Href0). In other words, the down control is executed such that the actual vehicle height H* is brought closer to a value (a control-purpose target vehicle height Href) obtained by adding a correction value A to the true target vehicle height Href0.

In the case where the vehicle is stopped for a long time, the air-chamber temperature T is substantially equal to the outside-air temperature, but the air-chamber temperature T is in most cases made higher than the outside-air temperature by, e.g., the engine during running of the vehicle and until a set length of time is elapsed after the ignition switch 98 is turned to the OFF state after the vehicle is stopped, for example. In the present embodiment, the second temperature sensor 94 detects the atmospheric temperature near the tank, and it is estimated that the atmospheric temperature detected by the second temperature sensor 94 is substantially equal to the temperature of the air stored in the tank 34. Also, since air is transferred between the tank 34 and the air chamber 19 in the vehicle height control, it is possible to estimate that the temperature T of the air in the air chamber 19 is substantially equal to the temperature of the air stored in the tank 34. Accordingly, in the present embodiment, the air-chamber temperature T is changed to an inside temperature Ti (Ti←T) which is a temperature of air as the pressure medium in the vehicle-height control system, and the value detected by the second temperature sensor 94 is used. It is noted that the inside temperature Ti may be a value estimated based the value detected by the second temperature sensor 94 or based on the value detected by the second temperature sensor 94 and a state of transfer of air between the air supply and discharge device 24 and the air chamber 19, for example.

In the present embodiment, it is possible to estimate that the inside temperature Ti is temporarily higher than an outside-air temperature To due to the disturbance, e.g., the engine in the case where one of the following conditions (i)-(iii) is satisfied. The condition (i) is the case where a temperature difference ΔT obtained by subtracting the outside-air temperature To from the inside temperature Ti is greater than a set value ΔTth (ΔT=Ti−To>ΔTth). In the case where the temperature difference ΔT is less than or equal to the set value ΔTth, it is considered that the inside temperature Ti changes with change of the outside-air temperature To, and there is a high possibility that the change of the inside temperature Ti is not a temporal change. In the case where the temperature difference ΔT is greater than the set value ΔTth, on the other hand, it is considered that the inside temperature Ti is temporarily high and would lower after the engine is stopped, for example. The condition (ii) is the case where an engine rotation speed N is higher than a set rotation speed Nth, and a torque TR is greater than a set torque TRth (N>Nth, TR>TRth). In the case where an output (a load) of the engine is large as in the condition (ii), it is considered that the vehicle-height control system is heated by a large degree of heating of the engine, and the inside temperature Ti is temporarily high. The condition (iii) is the case where an idling duration Z is longer than a set length of time Zth (Z>Zth). It is considered that even in the state in which the vehicle is stopped, when the idling duration is long, the vehicle-height control system is heated, and thereby the inside temperature Ti is temporarily high. This system may be configured such that each of the set rotation speed Nth and the set torque TRth is set to a value large enough not to be output in a normal running state, and a temperature difference corresponding to this value is set to the set value ΔTth, but this configuration is not essential. For example, each of the set rotation speed Nth and the set torque TRth may be set to a value which makes it possible to estimate that the inside temperature Ti is higher than the outside-air temperature To by heating of the engine, for example.

There will be next explained the true target vehicle height. The true target vehicle height is a value which is determined based on a purpose of the vehicle height control. Examples of the true target vehicle height include: a value which may achieve running stability; a value which may achieve improved ease of getting in and out of the vehicle; a value which may achieve improved appearance; a value determined by intention of the driver; and a value which may maintain the attitude of the vehicle. The true target vehicle height is not determined by the inside temperature. For example, in the case where the appearance improvement condition is satisfied in the state in which the vehicle is stopped, the true target vehicle height is determined to a predetermined height Ha with good appearance of the vehicle.

$$Href0 \leftarrow Ha$$

When it is determined that the vehicle is running at a high speed (vs>vth), the true target vehicle height is determined based on a vehicle speed vs. For example, the true target vehicle height may be determined to a value which is smaller when the vehicle speed vs is high than when the vehicle speed vs is low. The true target vehicle height is determined to a value which may achieve running stability and improved fuel consumption.

$$Hvs \leftarrow f(vs)$$

$$Href0 \leftarrow Hvs$$

In another case, when the vehicle-height switching switch 88 is operated, the vehicle height instructed by the switch 88 is determined as the true target vehicle height. For example, the down control is executed when the vehicle height instructed by the switch 88 is lower than the current vehicle height. Also, in the case where the vehicle height becomes higher due to reduction of load and ingress and egress of the occupant so as to keep a substantially horizontal attitude, the target vehicle height is determined for each wheel, and this target vehicle height is determined to the true target vehicle height.

Figure 7:
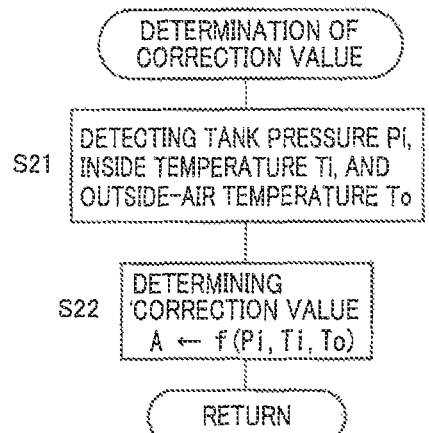
FIG. 7 is a flow chart illustrating a correction-value determination program stored in the storage.

There will be next explained the correction value. The correction value A is obtained by execution of a correction-value determination program represented by the flow chart in FIG. 7. At S21, the second temperature sensor 94 and the first temperature sensor 92 respectively detect the inside temperature Ti and the outside-air temperature To, and the tank pressure sensor 90 detects the tank pressure. In the present embodiment, the tank pressure is defined as an inside-system pressure Pi which is a pressure in the system.

Figure 8A:
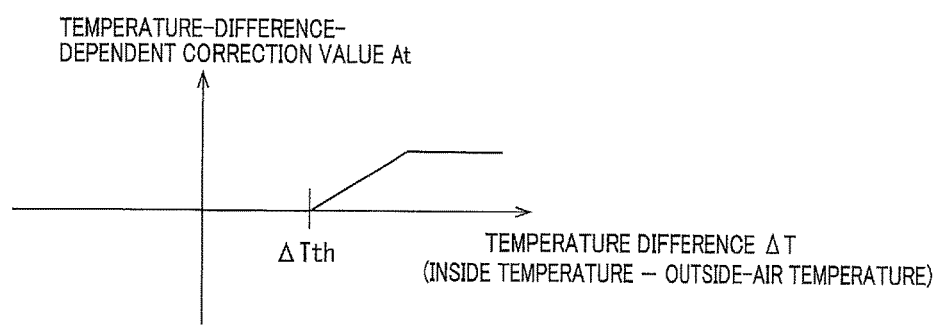
FIG. 8A is a map (a temperature difference) indicating a correction-value determination table.
Figure 8B:
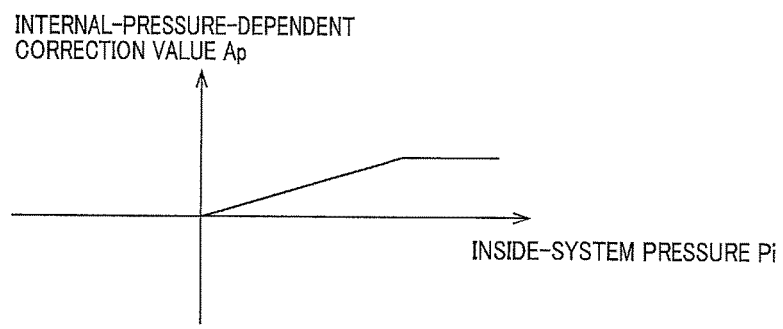
FIG. 8B is a map (an internal pressure of the system) indicating a correction-value determination table.

At S22, the correction value A is determined based on these parameters. In the present embodiment, the inside temperature Ti and the outside-air temperature To are detected at the same time, and the tank pressure Pi is detected. A correction value At (hereafter may be referred to as "temperature-difference-dependent correction value At") is obtained based on the temperature difference $\Delta T$ (=Ti−To). A correction value Ap (hereinafter may be referred to as "internal-pressure-dependent correction value Ap") is obtained based on the inside-system pressure Pi. The correction value A is obtained based on these correction values At, Ap. The correction value A may be determined to a value based on the sum of the correction values At, Ap $\{A=k\cdot(At+Ap)\}$ and may be determined to a value $\{A=\alpha At+(1-\alpha)Ap\}$ determined with consideration of a ratio $\alpha$ ($0<\alpha<1$). As illustrated in FIG. 8A, the temperature-difference-dependent correction value At is larger when the temperature difference $\Delta T$ is large than when the temperature difference $\Delta T$ is small. When the temperature difference $\Delta T$ is less than or equal to the set value $\Delta Tth$, the amount of lowering of the vehicle height with lowering of the inside temperature is small. Thus, the necessity of correction is low, and accordingly the correction value At is made zero when the temperature difference $\Delta T$ is less than or equal to the set value $\Delta Tth$. An upper limit value is provided for the correction value At to prevent the correction value At from becoming excessively large with increase in the temperature difference $\Delta T$. As illustrated in FIG. 8B, the internal-pressure-dependent correction value Ap is larger when the inside-system pressure Pi as the tank pressure is high than when the inside-system pressure Pi is low. In the case where the inside-system pressure Pi is high, when air is transferred from the air cylinders 2 back to the tank 34 in the down control, there is a high possibility that the tank pressure reaches the air-discharge threshold value, leading to needless air discharge. To avoid this situation, the internal-pressure-dependent correction value Ap is larger when the inside-system pressure Pi is high than when the inside-system pressure Pi is low to reduce increase in the tank pressure, making it difficult for the tank pressure to reach the air-discharge threshold value. It is noted that an upper limit value is also provided for the internal-pressure-dependent correction value Ap to limit increase in the correction value.

Figure 6:
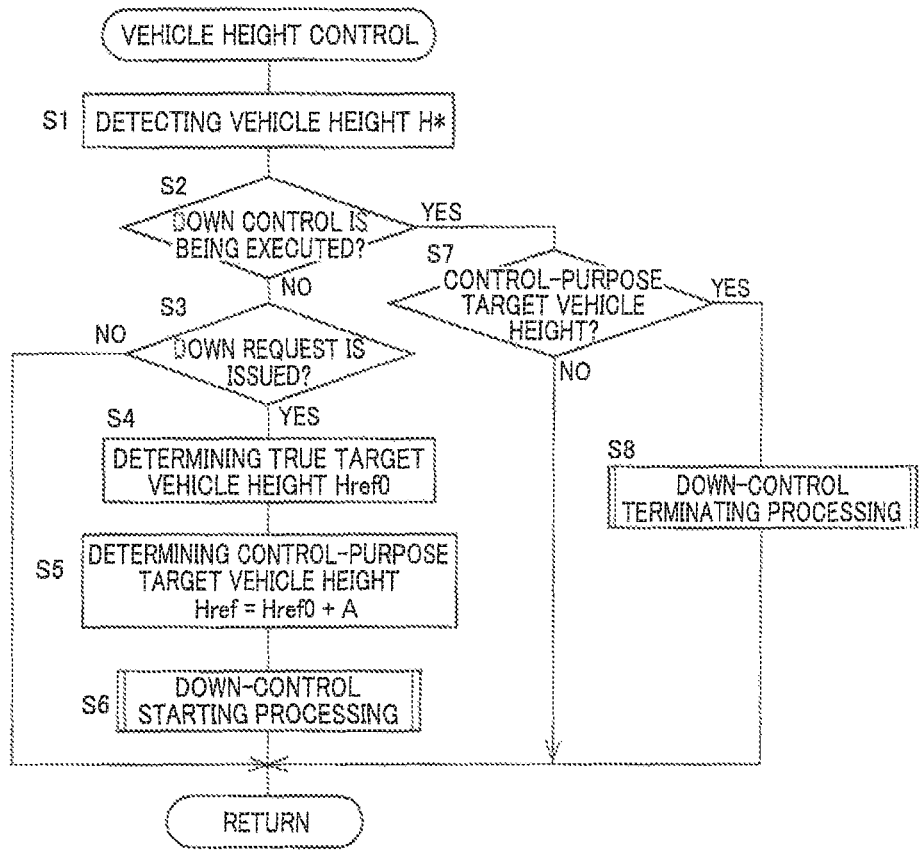
FIG. 6 is a flow chart illustrating a vehicle-height control program stored in a storage of the vehicle-height control ECU.

A vehicle-height control program represented by the flow chart in FIG. 6 is executed each time when a set length of time is elapsed. At S1, each of the vehicle height sensors 93 detects the actual vehicle height H* as the vehicle height for a corresponding one of the front left and right and rear left and right wheels. At S2, it is determined whether the down control is being executed. At S3, it is determined whether a down request is issued. When the down control is not being executed, and the down request is not issued, the processing at S1-S3 are repeated. When the down request is issued, a positive decision (YES) is made at S3, and the true target vehicle height Href0 is determined at S4 as described above. At S5, the correction value A is obtained, and the control-purpose target vehicle height Href is determined (Href=Href0+A). At S6, the down control is started. In this processing, the compressor 40 is activated, the circuit valves 62, 63 are opened, the circuit valves 61, 64 are closed, and the vehicle-height control valve 26 for the control target wheel is opened. When the present program is executed next time, a positive decision (YES) is made at S2 because the down control is being executed. Thus, it is determined at S7 whether the actual vehicle height H* has been brought close to the control-purpose target vehicle height Href. Specifically, it is determined whether the actual vehicle height H* becomes substantially equal to the control-purpose target vehicle height Href or whether the actual vehicle height H* falls within a range determined by the control-purpose target vehicle height Href and a width of a dead band h (Href±h), for example. When the actual vehicle height H* has been brought close to the control-purpose target vehicle height Href, a processing for terminating the down control is executed at S8. In this processing, all the vehicle-height control valves 26 are closed, the circuit valves 61, 63 are closed, and the electric motor 42 is stopped.

In the present embodiment as described above, in the case where the inside temperature Ti is high with respect to the outside-air temperature To due to, e.g., the disturbance, the actual vehicle height H* is brought closer to the control-purpose target vehicle height Href that is higher than the true target vehicle height Href0 by the correction value A. When the disturbance thereafter disappears, and the inside temperature Ti lowers and gets close to the outside-air temperature To, the actual vehicle height H* is brought closer to the target vehicle height Href0. Thus, for example, in the case where the appearance improvement condition is satisfied, the occupant may feel that the vehicle height is high at the completion of the down control, but the vehicle height thereafter lowers and is brought closer to a height with good appearance. During high speed running, the inside temperature Ti is in some cases bought closer to the outside-air temperature To in the case where a driving state of the vehicle is switched from a POWER mode to an ECO mode to reduce the output of the engine and reduce heating of the engine, for example. Thus, the vehicle height is controlled based on the temperature difference in the case where there is a high possibility that the inside temperature Ti is brought close to the outside-air temperature To during running. This control makes it possible to bring the vehicle height close to the true target vehicle height Href0 in the case where the inside temperature Ti lowers.

The control-purpose target vehicle height is set to a value larger than the true target vehicle height in the down control. This processing reduces a length of time required for operation of the compressor 40, thereby reducing power consumption of the battery 110 accordingly. Also, since air is transferred from the air cylinders 2 back to the tank 34 in the down control, the tank pressure rises, making it easier for the air discharge control to be executed. Also, the up control is executed when the actual vehicle height H* becomes lower than the true target vehicle height Href0 due to lowering of the inside temperature Ti after execution of the air discharge control. Shortage of the tank pressure in some cases increases the length of time required for the up control. In the present embodiment, in contrast, the amount of lowering of the vehicle height in the down control is small. Thus, an amount of increase in the tank pressure is reduced accordingly, making it difficult to start the air discharge control, resulting in reduction of needless discharge of air to the outside.

In the case where the air-chamber temperature T is lower than the value detected by the second temperature sensor 94, the temperature difference $\Delta T$ obtained by subtracting the value detected by the first temperature sensor 92 from the value detected by the second temperature sensor 94 is greater than a difference between the actual air-chamber temperature T and the outside-air temperature To. In the case where the outside-air temperature further lowers after the vehicle is stopped, the temperature difference at the stop of the vehicle is detected as a value greater than the actual temperature difference. Thus, even in the case where vehicle height control is executed, it is possible to bring the vehicle height close to the true target vehicle height when the outside-air temperature lowers. Also, the correction value A may be the same value during high speed running and in the stopped state of the vehicle but may be smaller during high speed running than in the stopped state. This is because lower vehicle height is preferable for running stability, and the inside temperature Ti less lowers during high speed running than in the stopped state.

In the present embodiment, a vehicle height controller is constituted by the tank pressure sensor 90, the vehicle height sensors 93, the second temperature sensor 94, the first temperature sensor 92, and the vehicle-height control ECU 80, for example. A target-vehicle-height determiner and a control-purpose-target-vehicle-height determiner are constituted by the tank pressure sensor 90, the second temperature sensor 94, the first temperature sensor 92, and portions of the vehicle-height control ECU 80 which store and execute the processing at S4 and S5 in the vehicle-height control program represented by the flow chart in FIG. 6 and a portion of the vehicle-height control ECU 80 which stores the tables in FIGS. 8A and 8B, for example. A correction value determiner is constituted by portions of the vehicle-height control ECU 80 which store and execute the processing at S5 (S21 and S22) and the portion of the vehicle-height control ECU 80 which stores the tables in FIGS. 8A and 8B, for example. A down controller is constituted by the vehicle height sensors 93 and portions of the vehicle-height control ECU 80 which store and execute the processings at S6 and S8, for example.

It is noted that change of the inside temperature Ti may be obtained based on change of the inside-system pressure Pi to detect the inside temperature Ti. For example, the outside-air temperature To at the point in time (may be referred to as "reference point in time") at which it is possible to estimate that the inside temperature Ti is equal to the outside-air temperature To is set to an inside temperature T1 (T1←To). An inside temperature T2 at the current time can be obtained based on the inside temperature T1 and a ratio between a pressure P1 at the reference point in time and a pressure P2 at the current time. The inside-system pressure Pi may be a pressure of air in, e.g., the passages 50, 52, 65, 66 and may be the tank pressure, for example.

$$P2/P1=T2/T1$$

$$T2=T1 \cdot P2/P1$$

Also, it is not essential to provide the first temperature sensor 92, and a predetermined temperature such as the standard temperature may be employed as the outside-air temperature To.

Also, the temperature-difference-dependent correction value At may be determined by any method. For example, the temperature-difference-dependent correction value At may be set to a value which gradually increases with increase in the temperature difference ΔT or set to a set correction value. Also, a map indicating a relationship between the correction value A and each of the inside temperature Ti, the outside-air temperature To, and the inside-system pressure Pi may be created in advance to determine the correction value A using a table representing the map, for example.

Second Embodiment

Figure 9:
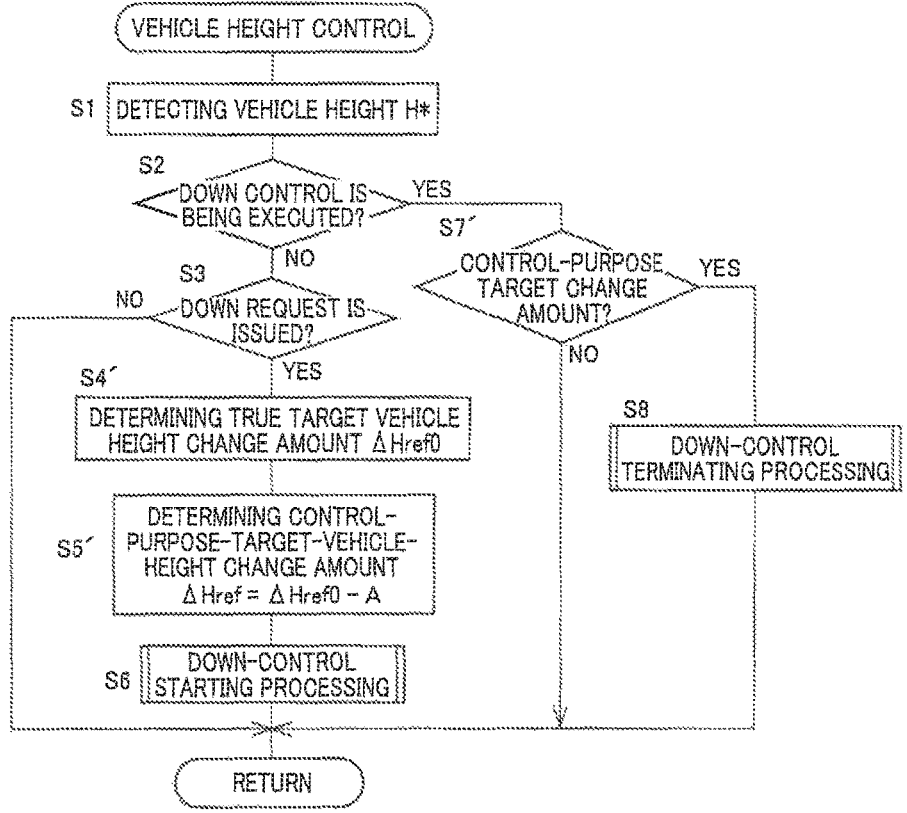
FIG. 9 is a flow chart illustrating a vehicle-height control program stored in a storage of a vehicle-height control ECU of a vehicle-height control system according to a second embodiment.

In this second embodiment, not the target vehicle height but a target-vehicle-height change amount is set in the vehicle height control. The flow chart in FIG. 9 represents one example of this control. It is noted that the same step numerals as used in the flow chart in FIG. 6 are used to designate the corresponding processings in the flow chart in FIG. 9, and an explanation of which is dispensed with. For example, at S4', a true target vehicle height change amount ΔHref0 is determined instead of the true target vehicle height. At S5', a control-purpose-target-vehicle-height change amount Δhref is determined by subtracting the correction value A from the true target vehicle height change amount ΔHref0 (ΔHref=ΔHref0−A). The down control is then executed so as to bring an actual vehicle-height change amount ΔH* closer to a control-purpose target change amount ΔHref. In the case where the down control is executed such that the actual vehicle-height change amount ΔH* reaches the control-purpose target change amount ΔHref, the down control may be executed such that the actual vehicle-height change amount ΔH* falls within a range determined by the control-purpose target change amount ΔHref and a width of a dead band Δh (ΔHref±Δh), for example.

It is estimated whether the temperature difference ΔT is greater than a set value ΔTth', based on the operating state of the engine (e.g., a torque, a rotation speed, and a driving duration) and the vehicle speed, for example. The set value ΔTth' may be larger than or equal to the set value ΔTth in the first embodiment. For example, it is possible to estimate that the inside temperature Ti is higher than the outside-air temperature To by the set value ΔTth' in the case where the engine rotation speed N is greater than the set rotation speed Nth', and the torque TR is greater than the set torque TRth' during running of the vehicle or in the case where the idling duration (the driving duration) Z is longer than a set length of time Zth' in the state in which the vehicle is stopped, for example. That is, statistics of the detected torques and rotation speeds are obtained during running of the vehicle and compared with the set torque TRth' and the set rotation speed Nth'. Whether the vehicle is running or stopped is obtained based on the vehicle speed. In the case where it is estimated that the temperature difference ΔT is greater than the set value ΔTth', the temperature-difference-dependent correction value At may be set to a fixed number At' greater than zero.

It is noted that whether the temperature difference is greater than the set value ΔTth' may be detected during running based on the operating state of the engine and the vehicle speed. For example, since the system is more easily cooled by winds when the vehicle speed is high than when the vehicle speed is low, it may be estimated that the temperature difference is small.

Figure 10:
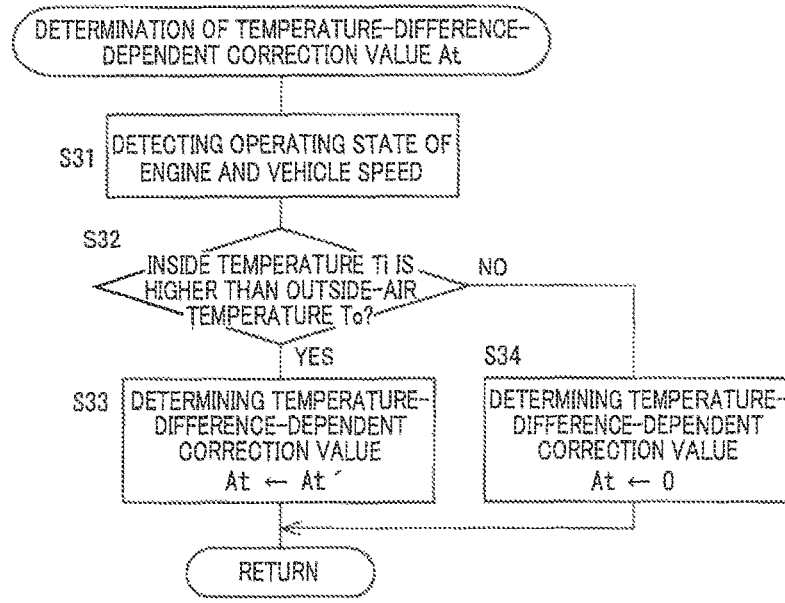
FIG. 10 is a flow chart illustrating a correction-value determination program stored in the storage.

FIG. 10 illustrates one example of this case. At S31, the operating state of the engine is detected by the engine-operating-state detector 97, and the vehicle speed is detected by values detected by the wheel speed sensors 99. At S32, it is determined whether the temperature difference ΔT is greater than the set value ΔTth' based on, e.g., the operating state of the engine and the vehicle speed, in other words, it is determined whether a large amount of heat is generated by the engine. When a positive decision (YES) is made at S32, the temperature-difference-dependent correction value At is set to the fixed number At' at S33. When a negative decision (NO) is made at S32, the temperature-difference-dependent correction value At is set to zero at S34. In the present embodiment as described above, the temperature difference ΔT is estimated based on the operating state of the engine. Thus, the second temperature sensor 94 and the first temperature sensor 92 are not essential. Also, the internal-pressure-dependent correction value Ap may be a value determined as in the first embodiment and may be zero, for example. It is not essential to determine the correction value A based on the internal-pressure-dependent correction value Ap. In the present embodiment, a temperature difference obtainer is constituted by portions of the vehicle-height control ECU 80 which store and execute the processings at S31 and S32.

It is to be understood that the disclosure is not limited to the details of the illustrated embodiments, but may be embodied with various changes and modifications, which may occur to those skilled in the art, without departing from the spirit and scope of the disclosure.

Claimable Inventions (1) A vehicle-height control system configured to control a vehicle height for a wheel, the vehicle-height control system comprising:

a vehicle-height control actuator provided so as to correspond to the wheel;

a pressure-medium supply and discharge device configured to supply and discharge a pressure medium to and from the vehicle-height control actuator; and a vehicle height controller configured to control the vehicle height by controlling the pressure-medium supply and discharge device based on an inside temperature and an outside-air temperature to control at least one of supply and discharge of the pressure medium to and from the vehicle-height control actuator, the inside temperature being a temperature in the vehicle-height control system.

The vehicle height controller controls the pressure-medium supply and discharge device based on the inside temperature and the outside-air temperature in at least one of up control for increasing the vehicle height and down control for reducing the vehicle height.

(2) The vehicle-height control system according to the above form (1), wherein the vehicle height controller is configured to control the pressure-medium supply and discharge device such that an actual vehicle height as an actual value of the vehicle height is brought closer to a target vehicle height, and the vehicle height controller comprises a target-vehicle-height determiner configured to determine the target vehicle height based on a temperature difference which is a value obtained by subtracting the outside-air temperature from the inside temperature.

The target vehicle height may be determined to a value which is greater when the temperature difference is large than when the temperature difference is small. The vehicle-height control system in some cases is heated by a heater such as an engine, leading to increase in the inside temperature. The temperature difference may be obtained as a value obtained by subtracting the outside-air temperature from the inside temperature but may be estimated based on an operating state of the heater such as the engine.

(3) The vehicle-height control system according to the above form (1) or (2), wherein the target-vehicle-height determiner comprises a control-purpose-target-vehicle-height determiner configured to determine a control-purpose target vehicle height as the target vehicle height by adding a correction value determined based on a temperature difference, to a true target vehicle height determined based on a state of a vehicle, and the temperature difference is a value obtained by subtracting the outside-air temperature from the inside temperature.

The true target vehicle height is determined for running stability, improved fuel consumption, and better appearance, for example. Furthermore, the true target vehicle height is determined by instruction provided by a passenger or determined based on a loading state, for example. The true target vehicle height is determined based on, e.g., a running speed, an operation of the vehicle-height switching switch, an appearance, and/or an attitude and not determined based on the inside temperature or the temperature difference.

(4) The vehicle-height control system according to the above form (1) or (2), wherein the target-vehicle-height determiner comprises a control-purpose-target-vehicle-height determiner configured to determine a control-purpose target vehicle height as the target vehicle height by adding a correction value determined based on a temperature difference, to a true target vehicle height determined based on a state of a vehicle, and the temperature difference is a value obtained by subtracting a reference temperature from the inside temperature.

The reference temperature may be the outside-air temperature or a standard temperature of an atmospheric temperature, for example. Since the outside-air temperature changes, an average value of atmospheric temperatures over one year or one month may be determined as the reference temperature, for example.

(5) The vehicle-height control system according to the above form (3) or (4), wherein the target-vehicle-height determiner comprises a correction value determiner configured to determine the correction value which is a value in a case where the temperature difference is large, to a value greater than the correction value which is a value in a case where the temperature difference is small.

(6) The vehicle-height control system according to any one of the above forms (1) through (5), wherein the vehicle height controller comprises a temperature difference obtainer configured to obtain, based on a state of a vehicle, whether the inside temperature is greater than one of the outside-air temperature and a reference temperature by a set value.

The state of the vehicle is a state of heating of a device mounted on the vehicle and may be represented by the operating state of the engine, for example. In the case where a load and an output of the engine are large, it is possible to estimate that the temperature of the engine is high. For example, the vehicle-height control system is warmed by heat of the engine, which increase the inside temperature. Thus, in the case where the temperature of the engine is high, it is possible to obtain that the inside temperature is higher than the reference temperature.

(7) The vehicle-height control system according to any one of the above forms (1) through (6), wherein the vehicle height controller comprises a down controller configured to lower the vehicle height for the wheel by controlling the pressure-medium supply and discharge device based on the inside temperature and the outside-air temperature to control discharge of the pressure medium from the vehicle-height control actuator.

(8) The vehicle-height control system according to any one of the above forms (1) through (7), wherein the pressure-medium supply and discharge device comprises a tank that stores the pressure medium, and wherein the down controller comprises a target-vehicle-height determiner configured to determine the target vehicle height which is a target vehicle height in a case where a tank pressure is high, to a value greater than the target vehicle height which is a target vehicle height in a case where the tank pressure is low, and the tank pressure is a pressure of the pressure medium stored in the tank.

(9) A vehicle-height control system configured to control a vehicle height for a wheel, the vehicle-height control system comprising:

a vehicle-height control actuator provided so as to correspond to the wheel;

a pressure-medium supply and discharge device configured to supply and discharge a pressure medium to and from the vehicle-height control actuator, the pressure-medium supply and discharge device comprising a tank that stores the pressure medium; and a vehicle height controller comprising a down controller configured to lower the vehicle height to a target vehicle height by controlling the pressure-medium supply and discharge device to control discharge of the pressure medium from the vehicle-height control actuator, the down controller comprising a target-vehicle-height determiner configured to determine the target vehicle height which is a target vehicle height in a case where a tank pressure is high, to a value greater than the target vehicle height which is a target vehicle height in a case where the tank pressure is low, and the tank pressure is a pressure of the pressure medium stored in the tank.

The vehicle-height control system according to this form may include the technical features according to any one of the above forms (1) through (8).

What is claimed is:

1. A vehicle-height control system configured to control a vehicle height for a wheel, the vehicle-height control system comprising:
    a vehicle-height control actuator provided so as to correspond to the wheel;
    a pressure-medium supply and discharge device configured to supply and discharge a pressure medium to and from the vehicle-height control actuator; and
    a vehicle height controller configured to control the vehicle height for the wheel by controlling the pressure-medium supply and discharge device based on an inside temperature and an outside-air temperature to control at least one of supply and discharge of the pressure medium to and from the vehicle-height control actuator, the inside temperature being a temperature in the vehicle-height control system,
    wherein the vehicle height controller is configured to determine, based on an operating state of an engine, whether the inside temperature is greater than the outside-air temperature by a set value.

2. The vehicle-height control system according to claim 1, wherein the vehicle height controller is configured to control the pressure-medium supply and discharge device such that an actual value of the vehicle height for the wheel is brought closer to a target vehicle height, and the vehicle height controller comprises a target-vehicle-height determiner configured to determine the target vehicle height which is a target vehicle height in a case where a temperature difference is large, to a value greater than the target vehicle height which is a target vehicle height in a case where the temperature difference is small, and the temperature difference is a value obtained by subtracting the outside-air temperature from the inside temperature.

3. The vehicle-height control system according to claim 2, wherein the target-vehicle-height determiner comprises a control-purpose-target-vehicle-height determiner configured to determine a control-purpose target vehicle height as the target vehicle height by adding a correction value determined based on the temperature difference, to a true target vehicle height determined based on a state of a vehicle.

4. The vehicle-height control system according to claim 3, wherein the target-vehicle-height determiner comprises a correction value determiner configured to determine the correction value which is a value in a case where the temperature difference is large, to a value greater than the correction value which is a value in a case where the temperature difference is small.

5. The vehicle-height control system according to claim 1, wherein the vehicle height controller comprises a down controller configured to lower the vehicle height for the wheel by controlling the pressure-medium supply and discharge device based on the inside temperature to control discharge of the pressure medium from the vehicle-height control actuator.

6. The vehicle-height control system according to claim 1, wherein the vehicle height controller is configured to determine, based on the operating state of the engine and a vehicle speed, whether the inside temperature is greater than the outside-air temperature by the set value.

7. The vehicle-height control system according to claim 6, wherein the vehicle height controller is configured to determine whether the inside temperature is greater than the outside-air temperature by the set value in a case where an engine rotation speed is greater than a set rotation speed, and a torque is greater than a set torque during running of the vehicle.

8. The vehicle-height control system according to claim 6, wherein the vehicle height controller is configured to determine whether the inside temperature is greater than the outside-air temperature by the set value in a case where an idling duration is longer than a set length of time in a state in which the vehicle is stopped.

* * * * *